United States Patent
Ozaki

(10) Patent No.: US 9,172,319 B2
(45) Date of Patent: Oct. 27, 2015

(54) MOTOR CONTROL DEVICE FOR ELECTRIC AUTOMOBILE

(71) Applicant: NTN CORPORATION, Osaka (JP)

(72) Inventor: Takayoshi Ozaki, Iwata (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 14/355,478

(22) PCT Filed: Nov. 14, 2012

(86) PCT No.: PCT/JP2012/079453
§ 371 (c)(1),
(2) Date: Apr. 30, 2014

(87) PCT Pub. No.: WO2013/073547
PCT Pub. Date: May 23, 2013

(65) Prior Publication Data
US 2014/0285128 A1   Sep. 25, 2014

(30) Foreign Application Priority Data

Nov. 18, 2011   (JP) ................. 2011-252223

(51) Int. Cl.
*H02P 6/14* (2006.01)
*H02P 21/00* (2006.01)
(Continued)

(52) U.S. Cl.
CPC . *H02P 6/142* (2013.01); *B60K 7/00* (2013.01); *B60L 3/0061* (2013.01);
(Continued)

(58) Field of Classification Search
CPC ..... H02P 21/0089; H02P 21/02; H02P 21/06; H02P 21/10; H02P 23/0095; H02P 23/14; H02P 21/0042; H02P 29/0066; H02P 6/001; H02P 21/0003; H02P 21/04; H02P 21/14; H02P 21/141; H02P 21/146
USPC ............... 318/139, 400.02, 400.13, 432, 492, 318/700, 718, 730
See application file for complete search history.

(56) References Cited

U.S. PATENT DOCUMENTS 5,650,706 A    7/1997  Yamada et al.
7,531,982 B2 *  5/2009  Okamura et al. ............. 318/701
(Continued)

FOREIGN PATENT DOCUMENTS

JP    59-47994     3/1984
JP    8-103093     4/1996
(Continued)

OTHER PUBLICATIONS

PCT International Preliminary Report on Patentability mailed May 30, 2014 in corresponding International Patent Application No. PCT/JP2012/079453.
(Continued)

*Primary Examiner* — Paul Ip

(57) ABSTRACT

A magnetic force estimating unit (38) for estimating the magnetic force of a permanent magnet of a rotor of a motor (6), a determining unit (39), and a demagnetization responsive timing changing unit (40) are provided in an inverter device (22) or an electric control unit (21). The magnetic force estimating unit (38) performs a determination of the magnetic force with a predetermined rule from detection signals of at least two of the motor rotation number, motor voltage and motor current. The determining unit (39) determines whether or not a demagnetization occurs. In response to the result of determination by the determining unit (39), the demagnetization responsive timing changing unit (40) changes the timing, at which the maximum electric current relative to the phase of the rotor is fed, so that with respect the motor drive by thinverter device the reluctance torque of the motor may be increased.

11 Claims, 7 Drawing Sheets

(51) Int. Cl.
*H02K 7/10* (2006.01)
*B60K 7/00* (2006.01)
*H02P 6/12* (2006.01)
*H02K 7/14* (2006.01)
*H02K 7/116* (2006.01)
*B60L 11/18* (2006.01)
*B60L 3/00* (2006.01)
*B60L 15/20* (2006.01)
*H02K 1/24* (2006.01)
*H02K 1/27* (2006.01)
*B60K 17/04* (2006.01)

(52) U.S. Cl.
CPC ........ *B60L 11/1803* (2013.01); *B60L 15/2036* (2013.01); *H02K 7/10* (2013.01); *H02K 7/116* (2013.01); *H02K 7/14* (2013.01); *H02P 6/12* (2013.01); *H02P 6/147* (2013.01); *B60K 7/0007* (2013.01); *B60K 17/046* (2013.01); *B60L 2220/14* (2013.01); *B60L 2220/16* (2013.01); *B60L 2220/46* (2013.01); *B60L 2240/24* (2013.01); *B60L 2240/421* (2013.01); *B60L 2240/423* (2013.01); *B60L 2240/425* (2013.01); *B60L 2240/80* (2013.01); *B60L 2250/26* (2013.01); *B60L 2260/28* (2013.01); *B60L 2260/44* (2013.01); *H02K 1/246* (2013.01); *H02K 1/2766* (2013.01); *Y02T 10/641* (2013.01); *Y02T 10/644* (2013.01); *Y02T 10/7005* (2013.01); *Y02T 10/7275* (2013.01)

(56) References Cited

U.S. PATENT DOCUMENTS

| | | | | |
|---|---|---|---|---|
| 7,622,883 | B2 * | 11/2009 | Kaizuka et al. | 318/730 |
| 7,804,261 | B2 * | 9/2010 | Atarashi et al. | 318/139 |
| 8,179,068 | B2 * | 5/2012 | Yuuki et al. | 318/432 |
| 8,327,670 | B2 * | 12/2012 | Maekawa et al. | 68/12.02 |
| 8,552,678 | B2 * | 10/2013 | Yuuki et al. | 318/718 |
| 8,704,467 | B2 * | 4/2014 | Hosoito et al. | 318/370 |
| 8,791,716 | B2 * | 7/2014 | Tanimoto et al. | 324/765.01 |
| 8,884,575 | B2 * | 11/2014 | Takahata et al. | 318/700 |
| 8,884,576 | B2 * | 11/2014 | Yuuki et al. | 318/718 |
| 8,912,739 | B2 * | 12/2014 | Kobayashi et al. | 318/400.02 |
| 2006/0119312 | A1 * | 6/2006 | Okamura et al. | 318/807 |
| 2008/0036415 | A1 * | 2/2008 | Kaizuka et al. | 318/730 |
| 2008/0129237 | A1 * | 6/2008 | Atarashi et al. | 318/492 |
| 2009/0261774 | A1 * | 10/2009 | Yuuki et al. | 318/720 |
| 2010/0139333 | A1 * | 6/2010 | Maekawa et al. | 68/212 |
| 2010/0242549 | A1 * | 9/2010 | Hosoito et al. | 68/139 |
| 2012/0146683 | A1 * | 6/2012 | Tanimoto et al. | 324/765.01 |
| 2012/0181970 | A1 * | 7/2012 | Yuuki et al. | 318/716 |
| 2013/0249448 | A1 * | 9/2013 | Kobayashi et al. | 318/400.02 |
| 2013/0272899 | A1 * | 10/2013 | Takahata et al. | 417/44.11 |
| 2013/0328511 | A1 | 12/2013 | Ozaki | |
| 2013/0334991 | A1 * | 12/2013 | Yuuki et al. | 318/400.02 |

FOREIGN PATENT DOCUMENTS

| | | |
|---|---|---|
| JP | 2004-328819 | 11/2004 |
| JP | 2006-258289 | 9/2006 |
| JP | 2008-168790 | 7/2008 |
| JP | 2010-110042 | 5/2010 |
| JP | 2010-268566 | 11/2010 |
| WO | WO 2012/114900 A1 | 8/2012 |

OTHER PUBLICATIONS

International Search Report mailed Jan. 29, 2013 in corresponding International Patent Application No. PCT/JP2012/079453.
Japanese Office Action dated Jul. 7, 2015 in corresponding Japanese Patent Application No. 2011-252223.

* cited by examiner

MOTOR CONTROL DEVICE FOR ELECTRIC AUTOMOBILE

CROSS-REFERENCE TO RELATED APPLICATIONS

This application is a U.S. national stage application of PCT/JP2012/079453 filed Nov. 14, 2012 and claims foreign priority benefit of Japanese Patent Application No. 2011-252223 filed Nov. 18, 2011 in the Japanese Intellectual Property Office, the contents of which are incorporated herein by reference.

This application is based on and claims Convention priority to Japanese patent application No. 2011-252223, filed Nov. 18, 2011, the entire disclosure of which is herein incorporated by reference as a part of this application.

BACKGROUND OF THE INVENTION

1. Field of the Invention

The present invention relates to an electrically driven vehicle such as, for example, a battery operated automobile or a fuel cell powered automobile utilizing a combination of fuel and battery and, more particularly, to a motor control device for the electric automobile of a type utilizing an interior permanent magnet synchronous motor.

2. Description of Related Art

In an electric automobile, reduction in performance and failure of a motor used to drive the automobile significantly affect the roadability and the safety. In particular, with an electric automobile drive device of a battery drive type, an embedded permanent magnet synchronous motor (also referred to as an IPM type DC brushless motor) utilizing a neodymium magnet and having a high efficiency performance has been utilized in order to increase the cruising distance with a limited available battery capacity. Also, in the field of an in-wheel motor device, the system has hitherto been suggested in which for the purpose of securement of the reliability, the temperature of, for example, a motor is measured to monitor the excessive load and the electric drive current for the motor is limited or the motor rotation number (motor number of revolutions or motor speed) is reduced in dependence on the measured temperature (such as disclosed in, for example, the patent documents 1 to 3 listed below).

[Patent Document 1] JP Laid-open Patent Publication No. 2006-258289
[Patent Document 2] JP Laid-open Patent Publication No. 2004-328819
[Patent Document 3] JP Laid-open Patent Publication No. 2008-168790

In the motor used for the electric automobile, particularly the motor of a type utilizing the neodymium permanent magnet, the permanent magnet has a low heat resistance temperature and, therefore, if the ambient temperature exceeds the heat resistance temperature, the irreversible demagnetization occurs. Accordingly, the motor driving capability abruptly decreases and, depending on the circumstances, the automobile will become unable to control. Although as described above, in the in-wheel motor device, the motor temperature is measured to monitor the excessive load and, if required, the drive is limited, the control relying on the result of measurement of the motor temperature is incapable of taking any countermeasure against the reduction in performance brought about by the demagnetization of the permanent magnet used in the motor.

In view of the foregoing, the present invention has for its primary object to provide a motor control device for an electric automobile, which device is capable of suppressing a reduction of the motor driving force in the event of the occurrence of demagnetization in a permanent magnet used in a motor.

Another important object of the present invention is to provide the electric automobile of the type referred to above, which can run by its own bootstraps, i.e., by its resources, to the nearest place where the maintenance servicing is available, with the reduction in motor driving force being prevented, in the event of the occurrence of demagnetization in a permanent magnet used in a motor.

The summary of the present invention will be hereinafter described with the aid of reference numerals shown in the accompanying drawings and used for facilitating a better understanding of preferred embodiments of the present invention.

SUMMARY OF THE INVENTION

The motor control device 20 herein disclosed in accordance with the present invention is a motor control device 20 for an electric automobile of a type equipped with a motor drive control unit 33 configured to perform a control appropriate to a magnetic pole position of a motor rotor 75 relative to an embedded permanent magnet synchronous motor, which is a motor 6 used to drive a vehicle wheel 2. This motor control device 20 includes a plurality of sensors 35, 36 and 37 configured to detect at least two of the motor rotation number, motor voltage and motor current of the motor 6 respectively, a magnetic force estimating unit 38 configured to estimate the magnetic force of a permanent magnet 80, used in the motor rotor 75 of the motor 6, from detection signals indicative of at least two of the motor rotation number, the motor voltage and the motor current of the motor 6 in accordance with a predetermined rule, a determining unit 39 configured to determine whether or not the magnetic force estimated by the magnetic force estimating unit 38 is within a predetermined permissible range which is determined as a range in which no demagnetization occur, and a demagnetization responsive timing change unit 40 configured to render the motor drive control unit 33 to change the timing, at which the maximum electric current relative to a phase of the motor rotor 75 is fed, in order to enable the reluctance torque of the motor 6 to increase in the event that the determining unit 39 determines the magnetic force to be out of the predetermined permissible range.

In the synchronous motor, an alternating current is fed through the stator coil 78 to form a revolving magnetic field to drive the motor rotor 75. In this case, in the embedded permanent magnet synchronous motor, a magnet torque, which is caused by the interaction between a permanent magnet 80 on a rotor side and a stator 73m, and a reluctance torque, which is attributable to an attraction force developed between a core element 79 on the rotor side and the stator 73m, are generated and the rotation takes place by the effect of those two types of torque. The magnet torque referred to above is proportional to the electric current and attains the maximum value when the phase θ between the revolving magnetic field and the rotor permanent magnet 80 is zero. On the other hand, the reluctance torque referred to above is proportional to the square of the electric current and attains the maximum value when the phase θ referred to above is 45°. Because of that, the embedded permanent magnet synchronous motor referred to above is generally driven under a current condition under which the sum of those two torques is maximized.

In the event that demagnetization occurs in the permanent magnet 60 on the rotor side as a result of, for example, an excessive increase of the temperature of the motor 6, the magnet torque decreases or attains a zero value. However, in the embedded permanent magnet synchronous motor, even though the demagnetization occurs in the permanent magnet 80, the motor can be driven by the reluctance torque to a certain extent.

Accordingly, the magnetic force of the permanent magnet 80 of the motor rotor 75 is estimated by the magnetic force estimating unit 38 and whether or not the estimated magnetic force is within the predetermined permissible range is determined by the determining unit 39. In the event that the determining unit 39 determines the estimated magnetic force to be out of the predetermined permissible range, that is, determines the occurrence of demagnetization, the timing at which the maximum electric current relative to the phase of the motor rotor 75 is fed is changed by the demagnetization responsive timing changing unit 40 so that the reluctance torque may be increased. Thus, by changing the timing, at which the maximum electric current relative to the phase of the motor rotor 75 is fed, so that the reluctance torque may be increased, in the event of the occurrence of demagnetization, a reduction of the driving force of the motor 6 is reduced to allow the electric automobile to be moved by its own bootstraps to, for example, a repair shop or roadside.

Estimation of the magnetic force and determination of the demagnetization can be performed in the following manner. With the motor 6 of a type utilizing a permanent magnet such as, for example, the embedded permanent magnet synchronous motor, an electromotive force is generated in the stator coil 78 as a result of rotation of the permanent magnet 80 of the motor rotor 75 and this electromotive force so generated increases with the magnetic force (that is, the magnetic flux density) of the permanent magnet 80. Because of that, when the motor rotation number and the motor voltage are compared with each other, the magnetic force of the permanent magnet is readily estimated. The electromotive force referred to above affects also the motor current and accordingly, when the motor rotation number and the motor voltage are compared with each other, the magnetic force of the permanent magnet is readily estimated. The relationship between the electromotive force referred to above and the magnetic force of the permanent magnet appears in the relationship between the waveform of the motor voltage and the waveform of the motor current, and the magnetic force of the permanent magnet is also estimated from the comparison thereof. The magnetic force estimating unit 38 estimates the magnetic force of the permanent magnet 80 of the rotor 75 of the motor 6 from detection signals indicative of at least two of the motor current, the motor voltage and the motor rotation number in accordance with the predetermined rule by providing the suitable rule, which defines the relationships of the motor rotation number, the motor voltage and the motor current referred hereinabove. The output of the magnetic force of the permanent magnet 80 so estimated may not be a unit descriptive of the magnetic force such as, for example, the magnetic flux density and may be, for example, a value or the like descriptive of which one of suitably defined stage of magnetic forces it belongs.

The determining unit 39 determined whether or not a demagnetization of the motor rotor occurs by comparing the magnetic force estimated by the magnetic force estimating unit 38, with the predetermined permissible range. While the demagnetization may occur as a result of heats of the permanent magnet 80, and/or cracking or the like in the permanent magnet 80, such demagnetization is determined by comparing the magnetic force estimated by the magnetic force estimating unit 38 with the predetermined permissive range. The predetermined permissive range referred to above may be suitably provided in accordance with the specification of the motor and others and further with, for example, a range that can be regarded as a normal range of the magnetic force, or a range stipulated in consideration with the safety factor.

In an embodiment of the present invention, the use may be made of a demagnetization responsive motor drive limiting unit 43 configured to limit a motor drive output from the motor drive control unit 33 in the event that the determining unit determines the magnetic force to be out of the predetermined permissible range. This limit of the drive may be, for example, a process of lowering the output of the electric current value or the torque that will become a drive command, or a process of halting the outputting.

In another embodiment of the present invention, the motor control device 20 may include an ECU 21, which is an electric control unit configured to integrally control the electric automobile as a whole, and an inverter device 22 including a power circuit unit 28, which includes an inverter 31 to convert a direct current power of a battery into an alternating current power used to drive the motor, and a motor control unit 29 configured to control at least the power circuit unit 28 in accordance with a control of the electric control unit 21, and the magnetic force estimating unit 38, the determining unit 39 and the demagnetization responsive timing changing unit 40 are provided in the inverter device 22. With respect to the demagnetization responsive motor drive limiting unit 43, it may be provided in the inverter device 22. While the electric control unit 21 and the inverter device 22 are generally provided in the electric automobile, the provision of the magnetic force estimating unit 38, the determining unit 39 and the demagnetization responsive timing changing unit 40 in the inverter device 22 at a position rather close to the motor 6 is effective to simplify the wiring system and does hence lead to a quick control. Also, the load of the electric control unit 21 which is getting complicated as it is sophisticated into a high functional equipment can be relieved.

Where the determining unit 39 and others referred hereinabove are provided in the inverter device 22, the inverter device 22 may be provided with an abnormality annunciating unit 44 configured to output information indicative of the occurrence of demagnetization to the electric control unit 22 in the event that the determining unit determines 39 the magnetic force to be out of the predetermined permissible range. The electric control unit 21 is a means to perform a control of the automobile as a whole and, where controls as drive limiting and other are carried out by means of the inverter device 22 and others, a proper integrated control can be performed over the entire automobile in response to the information indicative of the occurrence of the abnormality.

Where the motor control device 20 is comprised of the electric control unit 21 and the inverter device 22 referred hereinabove, the magnetic force estimating unit 38 and the determining unit 39 may be provided in the electric control unit 21. In this case, the structure of the inverter device 22 can be simplified.

Also, an abnormality display unit 42 configured to display and to annunciate the occurrence of an abnormality to a display device 27 in a driver's seat in the event that the determining unit 39 determines the occurrence of demagnetizationmay be provided in the electric control unit 21. With the presence of the abnormality being displayed in the display device 27 in the driver's seat, the driver can take a proper and fast treatment such as, for example, halt or slow movement of the automobile or running to the repair shop.

By applying a limit to the drive output from the motor 6 when lowering of the magnetic force is indicated by the determining unit 39, for example, by conducting a process of lowering the output of or halting the motor 6 while a high temperature condition is caused by the motor drive, a further increase of the high temperature beyond the current temperature is avoided to permit a further deterioration of the magnet of the motor 6 to be avoided beforehand. By way of example, where the motor 6 referred to above is an embedded permanent magnet synchronous motor of the type utilizing the neodymium permanent magnet, the heat resistance temperature of the permanent magnet 80 is low or when the ambient temperature exceeds that temperature, an irreversible demagnetization results in and, therefore, the motor driving performance deteriorates abruptly and, in the worst case, there may happen a risk that the automobile fails to run. However, if a treatment of output lowering or halt of the motor 6 is taken and the further deterioration of the permanent magnet 80 is prevented beforehand, the driving failure of the motor 6 can be avoided and the automobile is permitted to run to the repair shop or any other place where a remedy can be taken. It is to be noted that a predetermined permissible range of the determining unit 39 may differ between the predetermined permissible range, which is applicable where the demagnetization responsive timing changing unit 40 is allowed to function, and the predetermined permissible range which is applicable where the demagnetization responsive motor drive limiting unit 43 is allowed to function.

In a further embodiment of the present invention, the motor may be a motor used to individually drive vehicle wheels of the electric automobile. Where the vehicle wheels 2 are driven by the individual motor 6 respectively, it is necessary to balance driving torques of left and right driving wheels relative to each other. Even when running takes place in taking an emergency measure against the demagnetization, to obtain a torque balance between the left and right is desired. For this reason, effect of suppressing the reduction of the motor driving force, which is afforded by the provision of the demagnetization responsive timing changing unit 40 in accordance with the present invention can become more effective.

The motor 6 referred to above may form a part of an in-wheel motor drive device 8 of a type having a part or the whole thereof disposed inside a vehicle wheel 2 and made up of the motor 6, a wheel support bearing assembly 4 and a reduction gear 7. In the in-wheel motor drive device 8, as a result of compactization contemplated, the motor 6 is employed in the form of a motor having a high speed rotating specification. If the motor 6 rotates in a high speed, the eddy current loss is considerable and the heat emission resulting from the eddy current loss become high. For this reason, the permanent magnet 80 of the motor 6 is easy to have a high temperature and, because of this high temperature, the demagnetization is apt to occur in the permanent magnet 80. Accordingly, effects mentioned above brought about by the use of the demagnetization responsive timing changing unit 40 employed in the practice of the present invention can be further effective.

In a further embodiment of the present invention, the use may be made of a reduction gear 7 configured to reduce the speed of rotation of the motor 6, which reduction 7 is of a type having a high speed reducing ratio of 4 or higher. Also, the use may be made of a reduction gear 7 to reduce the speed of rotation of the motor 6, which reduction 7 is in the form of a cycloid reduction gear. With the cycloid reduction gear, a high speed reducing ratio can be obtained. Where the speed reducing ratio is increased, the motor 6 is used of a type compact in size and capable of undergoing a high speed rotation, then heat emission resulting from the eddy current loss becomes high. For this reason, the effects brought about by the provision of the demagnetization responsive timing changing unit 40 according to the present invention can become further effective.

The electric automobile of the present invention is that equipped with the motor control device 20 for the electric automobile as discussed above. For this reason, the advantage that in the event of occurrence of the demagnetization of the permanent magnet 80 of the motor 6 the reduction of the motor driving force can be suppressed by the motor control device 20 referred to above can be effectively exerted and, in the event of the occurrence of demagnetization, the running by its own bootstraps to the position where a repair is available can take place.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF PREFERRED EMBODIMENTS

An embodiment of the present invention will now be described in detail with particular reference to FIGS. 1 to 7.

Figure 1:
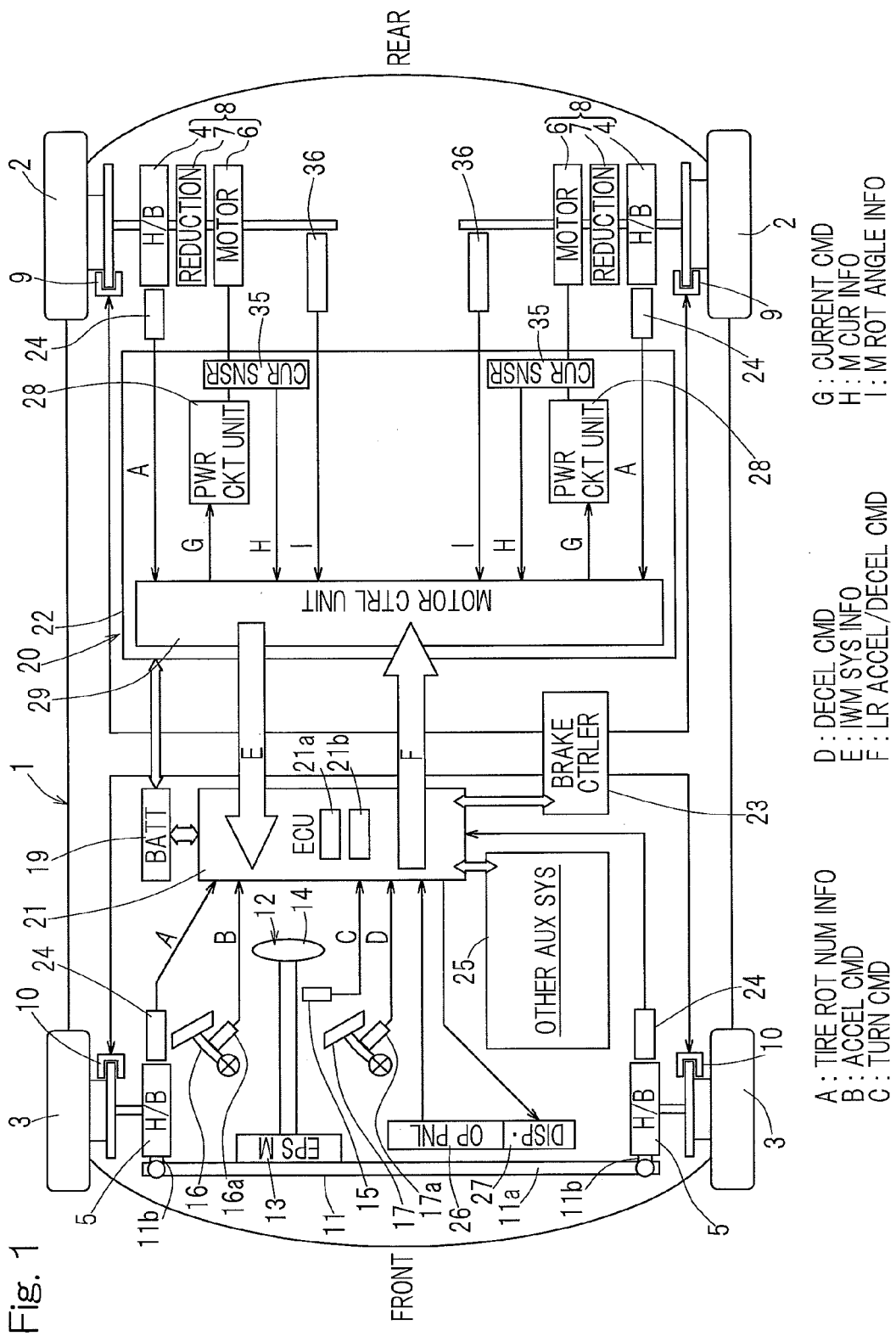
FIG. 1 is a block diagram showing a conceptual construction of an electric automobile designed in accordance with an embodiment of the present invention in a plan view.

The electric automobile shown particularly in FIG. 1 is a four wheeled vehicle including an automobile body structure 1, in which left and right rear wheels 2 are rendered to be driving wheels and left and right front wheels 3 are rendered to be steerable driven wheels. The vehicle wheels 2 and 3, which are rendered to be the driving and driven wheels, respectively, have tires mounted thereon and are rotatably supported by the automobile body structure 1 in any known manner through respective wheel support bearing assemblies 4 and 5. In FIG. 1, the wheel support bearing assemblies 4 and 5 are each designated by "H/B" which stands for an abbreviation of a hub bearing. The left and right vehicle wheels 2 and 2, which serve as the driving wheels, is driven by respective motors 6 and 6 that drive independently from each other. The rotation of the motor 6 is transmitted to the driving vehicle wheel 2 through a reduction gear 7 and a wheel support bearing assembly 4. The motor 6, the reduction gear 7 and the wheel support bearing assembly 4 altogether form an in-wheel motor drive device 8 which is a single assembled component, and the in-wheel motor drive device 8 is in part or whole disposed inside the vehicle wheel 2. The in-wheel motor drive device 8 is also referred to as an in-wheel motor unit. The motor 6 may be of a type capable of driving the vehicle wheel 2 directly, i.e., without the reduction gear 7. The driving and driven vehicle wheels 2 and 3 are provided with respective brakes 9 and 10 of, for example, a type of an electrically operated type.

The vehicle wheels 3 and 3, which will be the left and right front steerable wheels, respectively, can be steered by means of a common rudder mechanism 11 and can be steered, i.e., swung leftwards or rightwards, by a steering mechanism 12. The rudder mechanism 11 is a mechanism for changing the angle of left and right knuckle arms 11b, which hold respective wheel support bearing assemblies 5 when a tie rod 11a is moved leftwards or rightwards, and includes an electrically powered steering (EPS) motor 13, which is driven in response to a command from the steering mechanism 12 to move the tie rod 11a leftwards or rightwards through a rotary motion to linear motion converting mechanism (not shown). The steering angle is detected by a steering angle sensor 15 and an output of this steering angle sensor 15 is outputted to an electric control unit (ECU) 21, information therefrom is utilized in acceleration/deceleration commands and others for the left and right vehicle wheels.

Figure 2:
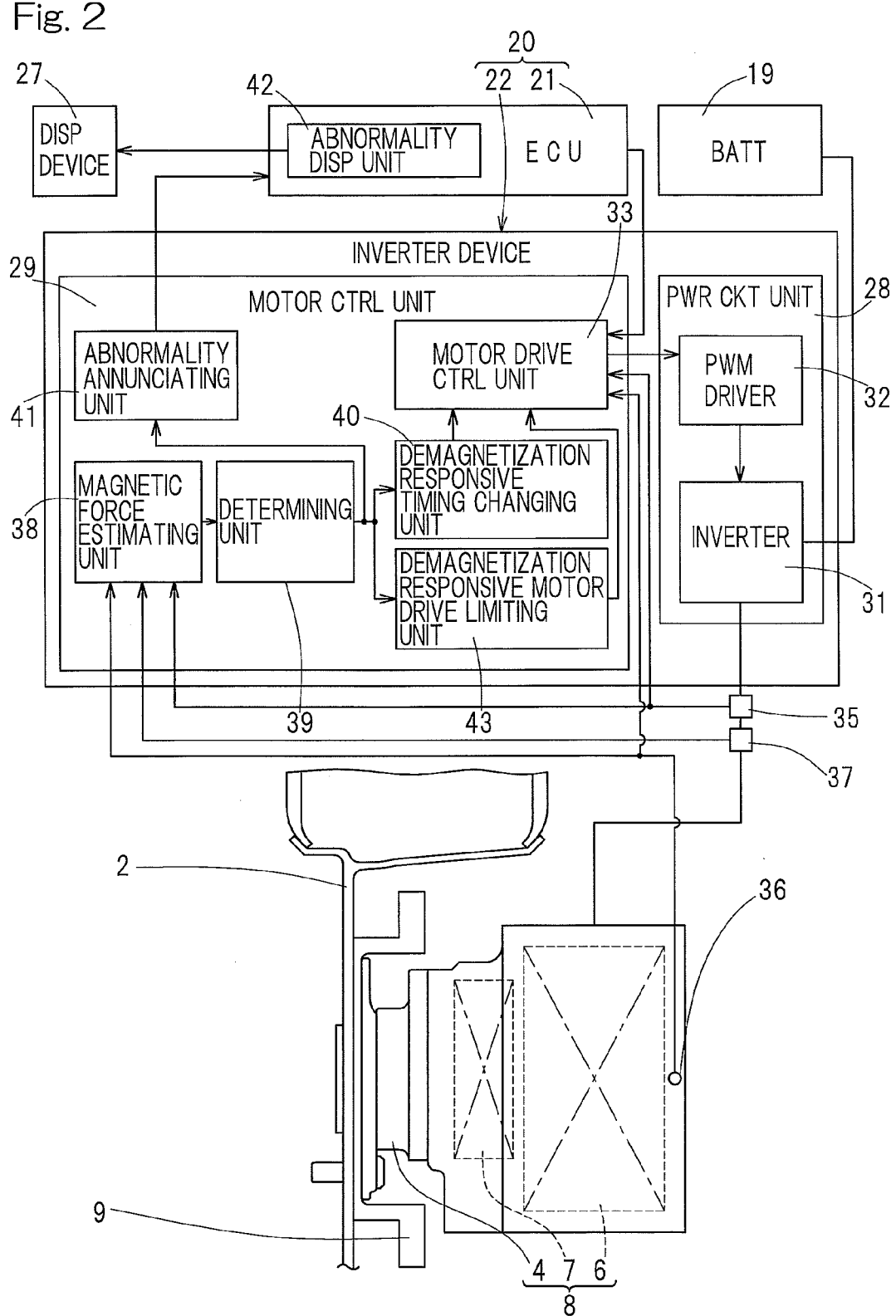
FIG. 2 is a block diagram showing a conceptual construction of an inverter device employed in the electric automobile shown in FIG. 1.
Figure 3:
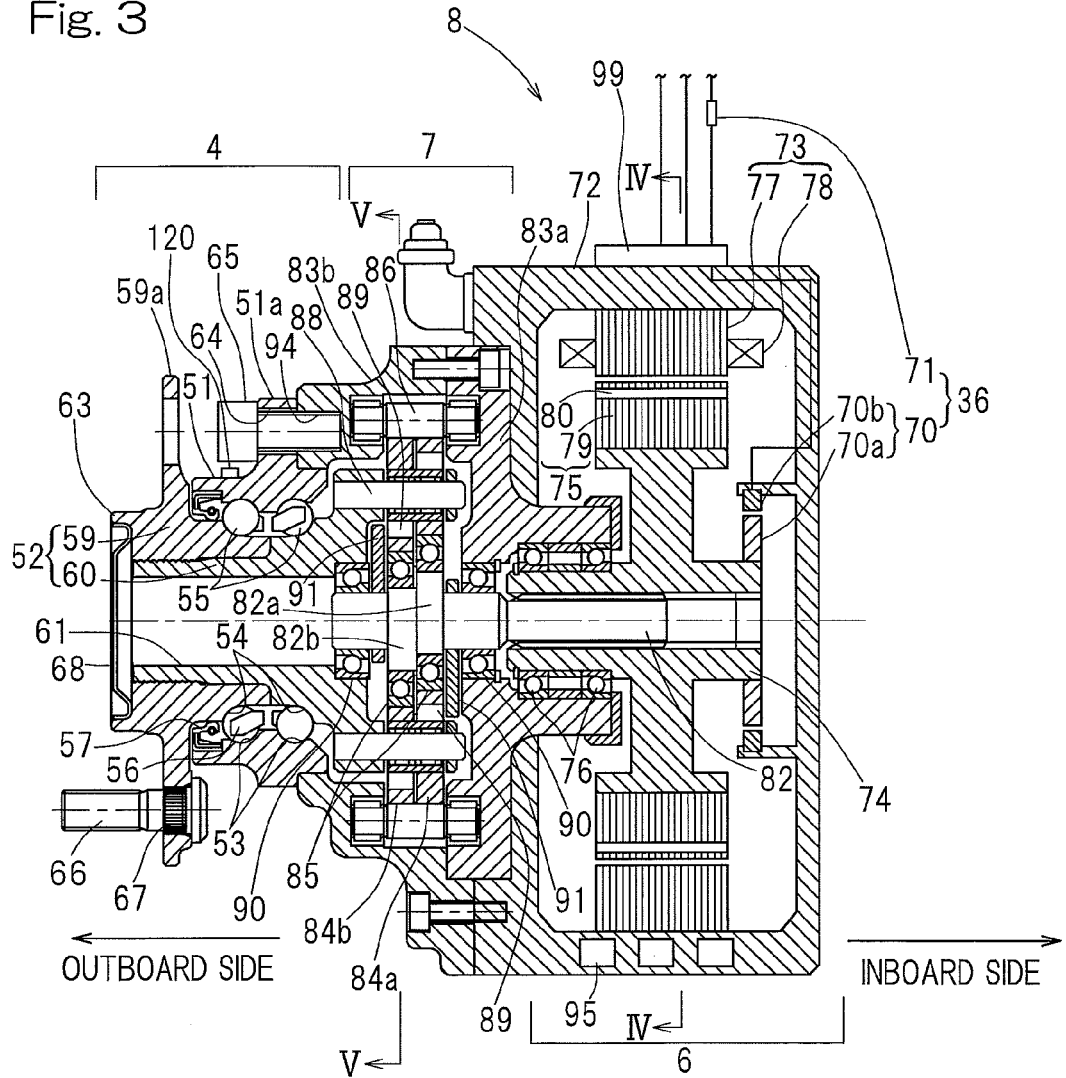
FIG. 3 is a front sectional view showing an in-wheel motor drive device employed in the electric automobile shown in FIG. 1.

As shown in FIG. 3, the in-wheel motor drive device 8 is of a structure in which the reduction gear 7 is interposed between the wheel support bearing assembly 4 and the motor 6 and a wheel hub of the vehicle wheel 2 (shown in FIG. 2), which is the driving wheel supported by the wheel support bearing assembly 4, and a rotation output shaft 74 of the motor 6 (shown in FIG. 3) are coaxially connected with each other. The reduction gear 7 is preferably of a type having a speed reducing ratio of 1/6 or more. This reduction gear 7 is in the form of a cycloidal reduction gear and is of a structure in which a rotation input shaft 82 coaxially connected with the rotation output shaft 74 of the motor 6 is formed with eccentric portions 82a and 82b and, on the other hand, curved plates 84a and 84b are mounted in the respective eccentric portions 82a and 82b through a bearing assembly 85 so that eccentric motions of the curved plates 84a and 84b cam be transmitted as a rotary motion to the wheel support bearing assembly 4. It is to be noted that hereinafter in this specification, terms "outboard" and "inboard" represent one side of the in-wheel motor drive device 8 away from the center of the width of the vehicle body and the other side of the in-wheel motor drive device 8 close to the center of the width of the vehicle body, respectively, when assembled in the vehicle body.

The wheel support bearing assembly 4 includes an outer member 51 having an inner periphery formed with a plurality of rows of rolling surfaces 53, an inner member 52 having an outer periphery formed with rolling surfaces 54 held in face to face relation with each rolling surfaces 53, and a plurality of rows of rolling elements 55 interposed between the rolling surfaces 53 in the outer member 51 and the rolling surfaces 54 in the inner member 52. The inner member 52 serves a hub mounting the driving wheel. This wheel support bearing assembly 4 is rendered to be a plurality of rows of angular contact ball bearing and the rolling elements 55 used therein are in the form of balls that are retained by a retainer 56 used for each row. The rolling surfaces 53 and 54 have an arc sectional shape respectively and those rolling surfaces 53 and 54 have contact angles that is held in back-to-back relation to each other. A bearing space delimited between the outer member 51 and the inner member 52 has one end on the outboard side sealed by a sealing member 57.

The outer member 51 is a stationary side raceway ring, and is rendered to be of one piece construction including a flange 51a connected with a housing 83b on the outboard side of the reduction gear 7. The flange 51a referred to above is provided with a bolt insertion hole 64 defined at a plurality of circumferential locations thereof. Also, the housing 83b is provided with an internally threaded bolt screwing hole 94 defined at a location corresponding thereof. Accordingly, when mounting bolts 65 inserted through the respective bolt insertion holes 64 are screwed to the corresponding bolt screwing holes 94, the outer member 51 can be fitted to the housing 83b.

The inner member 52 is a rotatable side raceway ring, and includes an outboard side member 59, having a wheel mounting hub flange 59a, and an inboard side member 60 integrated with the outboard side member 59 by means of fastening area where the outboard side is engaged with an inner periphery of the outboard side member 59. The rows of the rolling surfaces 54 referred to previously are formed in these outboard side members 59 and inboard side member 60, respectively. The inboard side member 60 has a center portion formed with a through bore 61 defined therein. The hub flange 59a integral with the inner member 52 has a press fitting hole 67 defined at a plurality of circumferential locations thereof for receiving a corresponding hub bolt 66. In the vicinity of a root portion of the hub flange 59a in the outboard side member 59, a cylindrical pilot portion 63 for guiding the driving wheel and a brake component (not shown) protrude towards the outboard side. The pilot portion 63 has an inner periphery provided with a cap 68 for closing the end on the outboard side of the through bore 61.

The motor 6 referred to previously is an embedded permanent magnet synchronous motor (that is, IPM motor) of a radial gap type in which a radial gap is defined between a motor stator 73, which is fixed to a cylindrical motor housing 72, and a motor rotor 75, fitted to a rotation output shaft 74. The rotation output shaft 74 is supported in a cantilevered fashion by a cylindrical portion of the housing 83a on the inboard side of the reduction gear 7 through two bearings 76.

Figure 4:
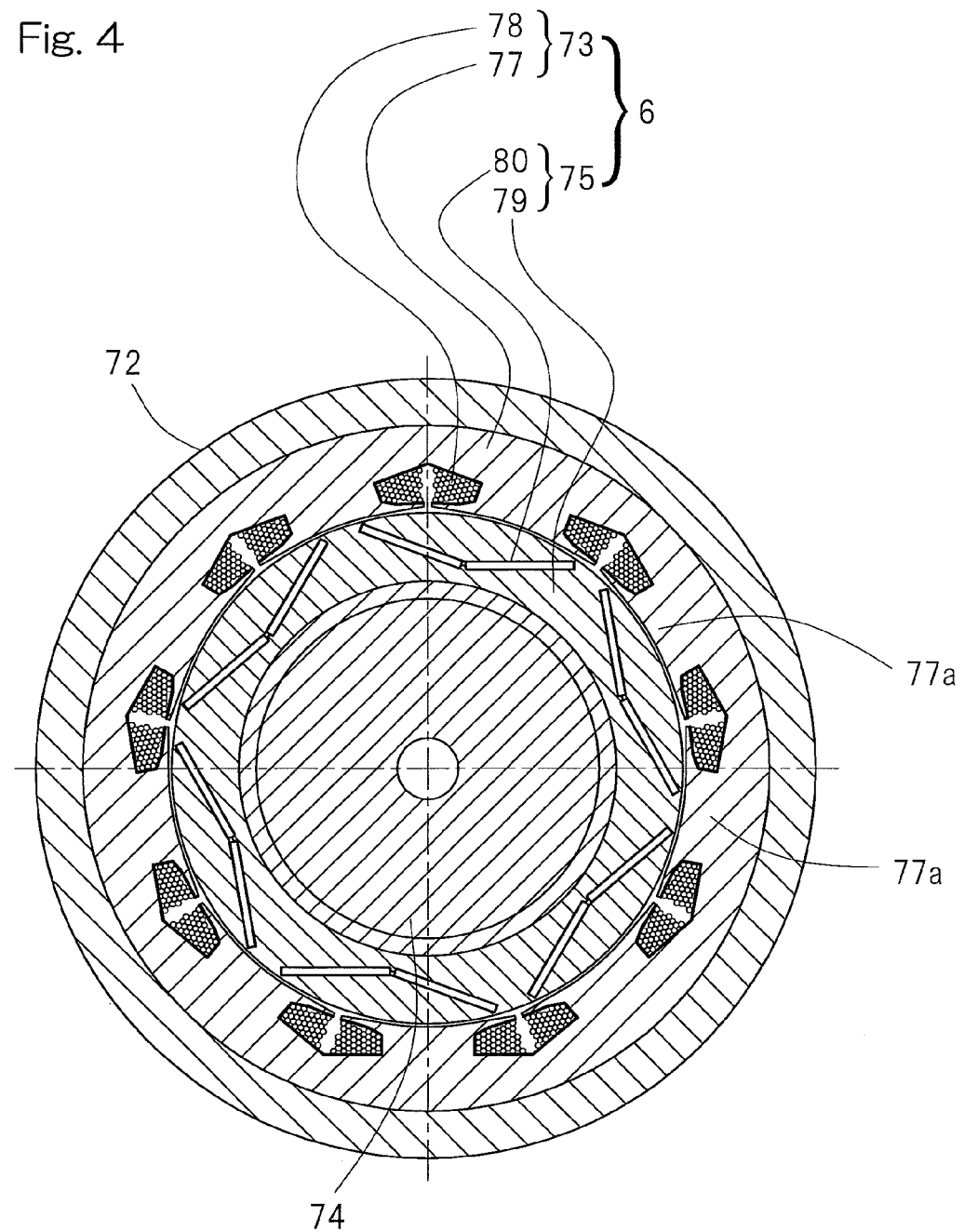
FIG. 4 is a cross-sectional view taken along the line IV-IV shown in FIG. 3, showing a motor portion in the electric automobile.

FIG. 4 illustrates a cross sectional view of the motor (which is taken along the line IV-IV in FIG. 3). The motor rotor 75 of the motor 6 is made up of a core portion 79, comprised of a soft magnetic material such as, for example, a laminated silicon steel plate, and a permanent magnet 80 built in the core portion 79. The permanent magnet 80 is of a structure in which neighboring two permanent magnets are arranged in a V sectioned shape on the same circumference within the rotor core portion 79 so as to face with each other. The permanent magnet 80 is employed in the form of a neodymium magnet. The stator 73 is comprised of a core portion 77 made of a soft magnetic material, and a coil 78. The core portion 77 has its outer peripheral surface which is a ring shape having a circular sectional shape, and a plurality of teeth 77a each protruding towards an inner diametric side, are formed in an inner peripheral surface of the core portion 77 in a row along the circumferential direction thereof. The coil 78 is wound around each of the teeth 77a which forms a projecting pole of the stator core portion 77.

As shown in FIG. 3, the motor 6 is provided with an angle sensor 36 for detecting the relative rotation angle between the motor stator 73 and the motor rotor 75. This angle sensor 36 includes an angle sensor main body 70 for detecting and outputting a signal indicative of the relative rotation angle between the motor stator 73 and the motor rotor 75 and an angle calculation circuit 71 for calculating the angle from a signal outputted from the angle sensor main body 70. The angle sensor main body 70 is made up of a to-be-detected portion 70a, provided in an outer peripheral surface of the rotation output shaft 74, and a detecting portion 70b provided in the motor housing 72 in the vicinity of the to-be-detected portion 70a and disposed so as to face the to-be-detected portion 70a in a direction, for example, radially thereof.

It is, however, to be noted that the to-be-detected portion 70a and the detecting portion 70b may be disposed in the vicinity of each other so as to confront each other in a direction axially thereof and that the angle sensor 36 may be employed in the form of a resolver.

The motor 6 being of the structure described above is so designed that, in order to maximize the efficiency thereof, the timing of application of each phase of each wave of an alternating current supplied to the coil 78 of the motor stator 73 is controlled by a motor drive control unit 33 (shown in FIG. 2) of a motor control unit 29 on the basis of the relative rotation angle between the motor stator 73 and the motor rotor 75, which is detected by the angle sensor 36. It is to be noted that a wiring for a motor current of the in-wheel motor drive device 8 and wirings for various sensor systems and command systems are collectively accomplished by a connector 99 provided in the motor housing 72 and others.

Figure 5:
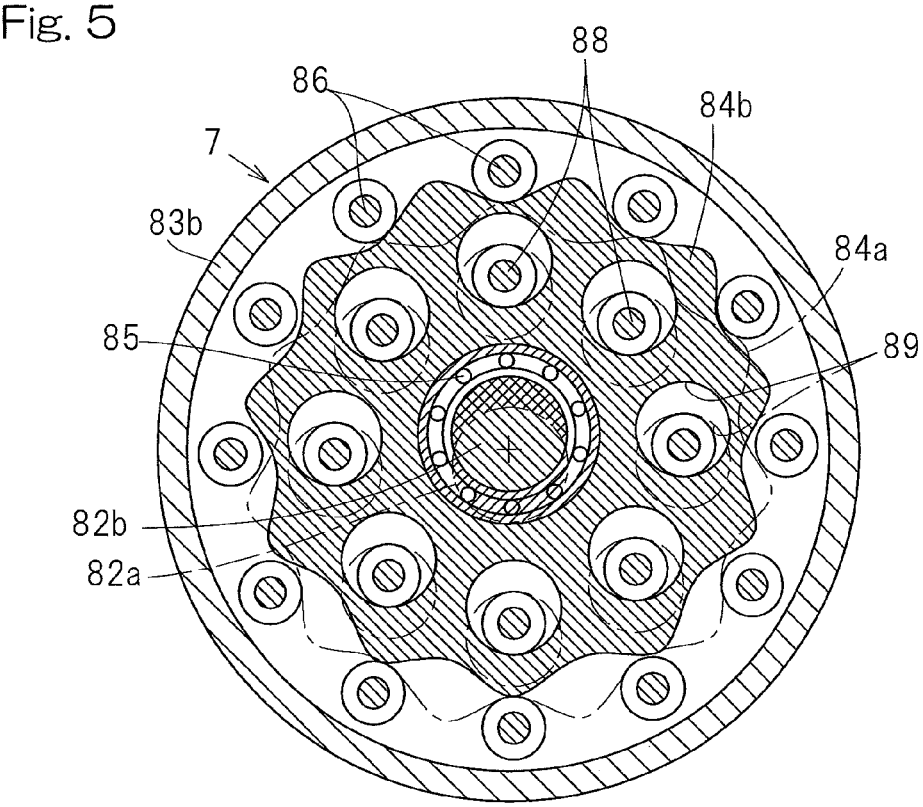
FIG. 5 is a cross sectional view taken along the line V-V shown in FIG. 3, showing a reduction gear portion in the electric automobile.

The reduction gear 7 is in the form of the cycloid reduction gear as hereinbefore described and is of a structure in which, as shown in FIG. 5, two curved plates 84a and 84b, each having such a outer shape as to represents a gentle wavy trochoidal curve, are mounted on respective eccentric portions 82a and 82b of the rotation input shaft 82 through associated bearings 85. A plurality of outer pins 86 for guiding respective eccentric motions of those curved plates 84a and 84b on an outer peripheral side are provided in the housing 83b so as to traverse the latter and a plurality of inner pins 88 fitted to the inboard side member 60 of the inner member 2 are engaged having been inserted into respective round throughholes 89 defined within the each curved plate 84a and 84b. The rotation input shaft 82 is splined to the rotation output shaft 74 of the motor 6 and is accordingly rotatable together with such rotation output shaft 74. It is to be noted that the rotation input shaft 82 is supported by the housing 83a on the inboard side and an inner diametric surface of the inboard side member 60 of the inner member 52 through two spaced bearings 90.

When the rotation output shaft 74 of the motor 6 rotates, the curved plates 84a and 84b mounted on the rotation input shaft 82 rotatable together with such rotation output shaft 74 undergo the respective eccentric motions. The eccentric motions of those curved plates 84a and 84b are transmitted to the inner member 52 as a rotary motion by means of the engagement between the inner pins 88 and the throughholes 89. The rotation of the inner member 52 so effected in the manner described above takes place at a speed reduced relative to the rotation of the rotary output shaft 74 accordingly. By way of example, the speed reducing ratio of 1/10 or high can be obtained with a single stage cycloid reduction gear.

The two curved plates 84a and 84b are mounted on the respective eccentric portions 82a and 82b of the rotation input shaft 82 in a 180° phase displaced relation to each other so that the respective eccentric motions can be counterbalanced with each other and, so that fluctuations caused by the eccentric motions of the curved plates 84a and 84b can be counterbalanced with each other, two counter weights 91 are mounted on the both side of the each eccentric portion 82a, 82b made eccentric in a fashion radially offset relative to the direction of eccentricity of the each eccentric portion 82a and 82b.

Figure 6:
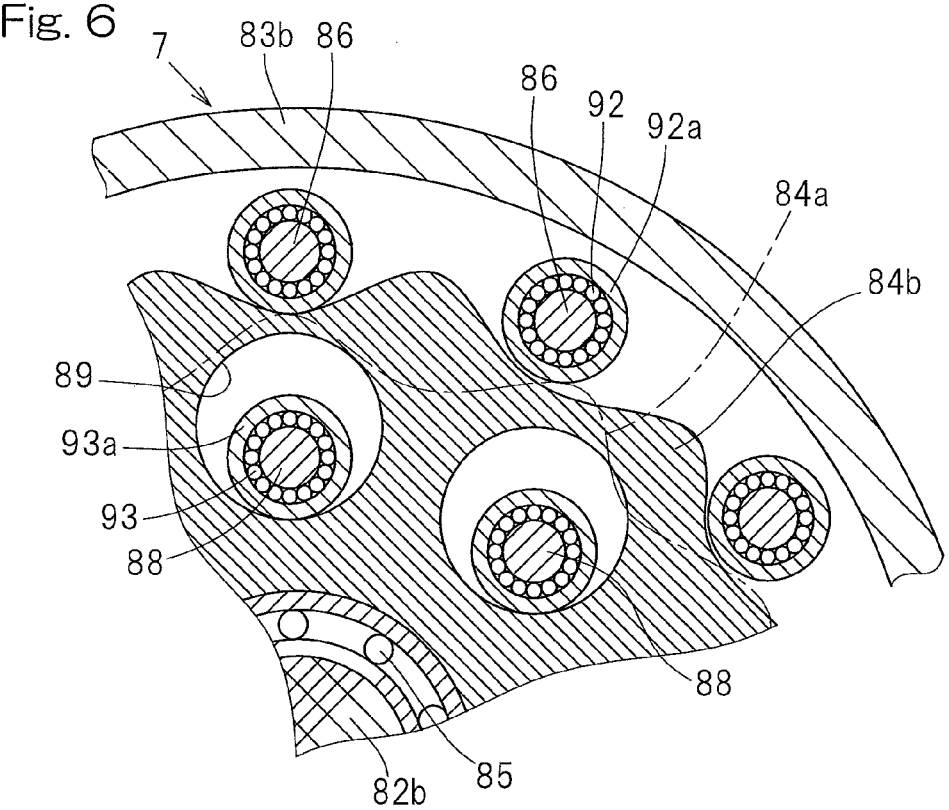
FIG. 6 is a fragmentary enlarged sectional view showing the reduction gear portion shown in FIG. 5.
Figure 7:
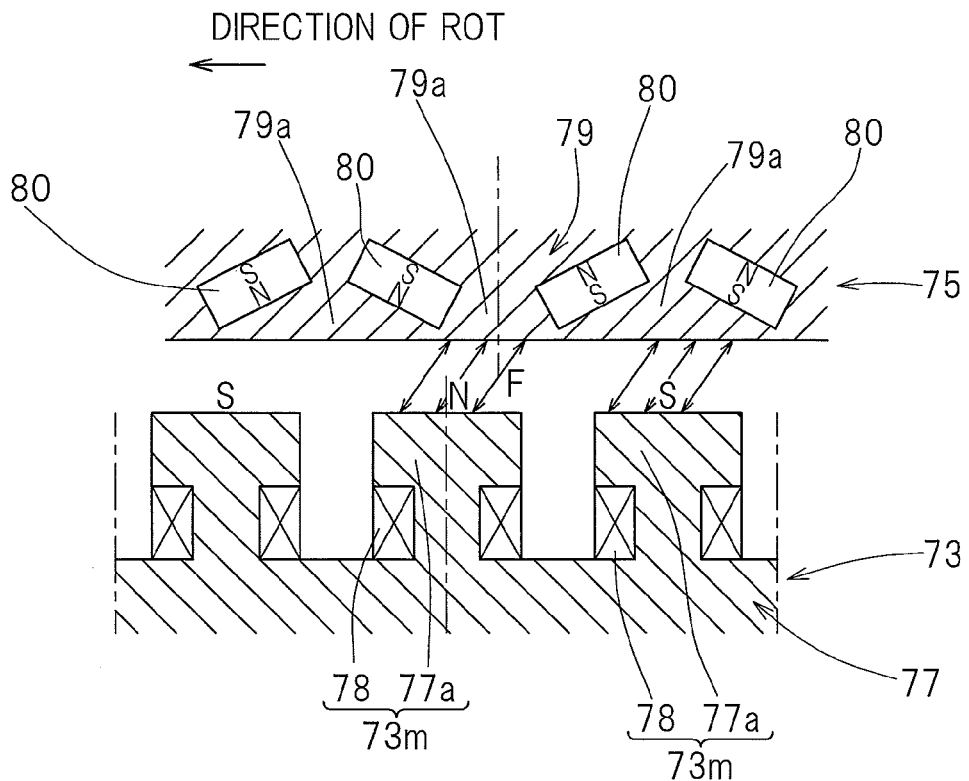
FIG. 7 is an explanatory diagram used to explain the function of a reluctance torque of the motor that is an object to be controlled.

As shown on an enlarged scale in FIG. 6, each of the outer pins 86 and each of the inner pins 88 have respective bearings 92 and 93 mounted thereon and outer rings 92a and 93a of those bearings 92 and 93 are held in rolling contact with the outer peripheries of the each curved plate 84a and 84b and an inner periphery of the associated throughholes 89. Accordingly, while the contact resistance between each of the outer pins 86 and the outer periphery of any one of the curved plates 84a and 84b and the contact resistance between each of the inner pins 88 and the inner periphery of any one of the throughholes 98 are reduced, the respective eccentric motions of the curved plates 84a and 84b can be smoothly transmitted as a rotary motion to the inner member 52.

Referring to FIG. 3, the wheel support bearing assembly 4 employed in the in-wheel motor drive device 8 is fixed to the automobile body structure at an outer peripheral portion of the housing 72 of the motor 6 or the housing 83b of the reduction gear 7 through an automobile suspension system (not shown) of a knuckle and others.

The control system will now be described in detail with particular reference to FIG. 1. The electric control unit 21 for performing a control of the automobile in its entirety, an inverter device 22 for controlling the driving motor 6 in accordance with a command of the electric control unit 21, and a brake controller 23 are mounted on the automobile body structure 1. In particular, the electric control unit 21 and the inverter device 22 cooperate with each other to form the motor control device 20. The electric control unit 21 is comprised of a computer, a program executed by the computer, and various electronic circuits and others.

The electric control unit 21, when classified functionally, can be divided into a drive control unit 21a and a general control unit 21b. The drive control unit 21a generates an acceleration/deceleration command, which is to be applied to the driving motors 6 and 6 in the left and right wheels, from an acceleration command outputted by an accelerator operating unit 16, a deceleration command outputted by a brake operating unit 17 and a turn command outputted by the steering angle sensor 15 and outputs this command to the inverter device 22. In addition, the drive control unit 21a may however have a function of correcting the acceleration/deceleration command, outputted therefrom, with the use of information on the tire number of revolutions, which is obtained from a rotation sensor 24 provided in each of the wheel support bearing assemblies 4 and 5 in the vehicle wheels 2 and 3 and information of various vehicle mounted sensors. The accelerator operating unit 16 is comprised of an accelerator pedal and a sensor 16a capable of detecting the pedaling amount of the accelerator pedal and then outputting the acceleration command referred to previously. The brake operating unit 17 is comprised of a brake pedal and a sensor 17a capable of detecting the pedaling amount of the brake pedal and then outputting the deceleration command referred to previously.

The general control unit 21b of the electric control unit 21 has, for example, a function of outputting the deceleration command, outputted by the brake operating unit 17 to the brake controller 23, a function of controlling various auxiliary equipment systems 25, a function of processing an input command from an operating panel 26 in a console, and a function of causing a display device 27 to make displays. The display device 27 is of a type capable of displaying images, such as, for example, a liquid crystal display device. The auxiliary equipment systems 25 referred to above includes, for example, an air conditioner, lights, wipers, a global positioning system (GPS), air bags and so on and are shown collectively in one block here.

The brake controller 23 is a means for applying a braking command to any one of the brakes 9 and 10 of the front and rear vehicle wheels 2 and 3 according to the braking command outputted from the electric control unit 21, which includes, in addition to a command generated in response to the deceleration command outputted by the brake operating unit 17, a command generated by means for improving the safety factor peculiar to the electric control unit 21. The brake controller 23 additionally have an anti-lock brake system. This brake controller 23 is comprised of an electronic circuit and a microcomputer or the like.

The inverter device 22 is comprised of a power circuit unit 28 provided for each of the motors 6 and a motor control unit 29 for controlling these power circuit units 28. It is, however, to be noted that the motor control unit 29 may provided in common to each power circuit unit 28 or separately to each other, but even when it is provided in common to each power circuit unit 28 mentioned above, each power circuit unit 28 may be rendered to be independently controllable so that, for example, the each motor torque may differ. The motor control unit 29 has a function of outputting each information (hereinafter referred to as "IWM system information) on various detection values, control values and others associated with the in-wheel motor 8, which is possessed by the motor control unit 29, to the electric control unit.

FIG. 2 illustrates a block diagram showing a conceptual construction of the inverter device 22. The power circuit unit 28 is comprised of an inverter 31 for converting a direct current power of a battery 19 into a three phase alternating current power, which is used in driving the motor 6, and a PWM driver 32 for controlling the inverter 31. The inverter 31 is made up of a plurality of semiconductor switching elements (not shown) and the PWM driver 32 performs a pulse width modulation of an inputted current command to apply an ON-OFF command to each of the semiconductor switching elements referred to above.

The motor control unit 29 is comprised of a computer, a program, which is executed by the computer, and electronic circuits and has the motor drive control unit 33 as its underlying control unit. The motor drive control unit 33 is a means in response to the acceleration/deceleration command such as, for example, a torque command or the like applied from the electric control unit, which is a host control means, to convert thereof into the electric current command, and then to apply the electric current command to the PWM driver 32 of the power circuit unit 28. The motor drive control unit 33 performs an electric current feedback control when a motor current value to be fed from the inverter 31 to the motor 6 is applied from an electric current detecting unit 35. Also, the motor drive control unit 33 performs a control such as, for example, a vector control appropriate to the magnetic pole position when the angle of rotation of the rotor of the motor 6 is applied from the angle sensor 36.

In the embodiment now under discussion, the motor control unit 29 of the structure discussed hereinabove is provided with a magnetic force estimating unit 38 to be referred hereinafter, a determining unit 39, a demagnetization responsive timing changing unit 40, a demagnetization responsive motor drive limiting unit 43, and an abnormality annunciating unit 41, and the electric control unit 21 is provided with an abnormality display unit 42. It is to be noted that the magnetic force estimating unit 38, the determining unit 39, the demagnetization responsive timing changing unit 40 and the demagnetization responsive motor drive limiting unit 43 may be provided in the electric control unit 21.

The magnetic force estimating unit 38 is a means to estimate the magnetic force of the permanent magnet of the rotor of the motor 6 in accordance with a predetermined rule from at least two among detection signal outputs from the angle sensor 36 for detecting the angle of rotation of the motor revolution number of the motor 6, an electric current sensor 35 for detecting the motor current, and a voltage sensor 37 for detecting a motor voltage, that is, from detection signals indicative of at least two of the motor rotation number, the motor current and the motor voltage.

In the synchronous motor 6, an electromotive force is generated in the stator coil 78 as a result of rotation of the permanent magnet of the rotor and this electromotive force so generated increases with the increase of the magnetic force of the permanent magnet 80, that is, the increase of the magnetic flux density thereof. Because that, when the motor rotation number and the motor voltage are compared with each other, the magnetic force of the permanent magnet is readily obtained. Since the electromotive force referred to above affects also the motor current, the comparison with the motor rotation number and the motor current makes the magnetic force of the permanent magnet readily. The magnetic force of the permanent magnet also appears in the relationship between the waveform of the motor voltage and the waveform of the motor current and, by the comparison thereof, the magnetic force of the permanent magnet is obtained.

The magnetic force estimating unit 38 referred to above estimates the magnetic force of the permanent magnet 70 of the motor rotor 75 in the motor 6 in accordance with the predetermined rule from the detection signals indicative of at least two of the motor current, the motor voltage and the motor rotation number by providing an appropriate rule which defines the relationship between the motor rotation number, the motor voltage and the motor current referred to above. An output of the magnetic force of the permanent magnet 80 so estimated may not necessarily be a unit indicative of the magnetic force such as, for example, the magnetic flux density or the like and may be a value or the like which is indicative of, for example, which one of appropriately determined stages of magnetic forces it belongs. It is to be noted that the magnetic force estimating unit 38 may be of a type capable of estimating the magnetic force by performing, when the magnetic force of the permanent magnet 80 is to be estimated, a comparison between the motor rotation number and the motor voltage, a comparison between the motor rotation number and the motor current, and a compassion between the waveform of the motor voltage and the waveform of the motor current.

The determining unit 39 is a means to compare the magnetic force, which has been estimated by the magnetic force estimating unit 38, with the predetermined permissible range and then to determine whether or not it is a demagnetization of the motor rotor 75. The predetermined permissible range is recommended to set up in reference to, for example, the specification or the like of the motor 6. This predetermined permissible range may be set up as a range of, for example, one threshold value or more. The magnetic force estimating unit 38 may be of a type capable of providing a two-value output of demagnetization or not demagnetization and, also, capable of providing an output of determination in the form of a stepwise or continuous value descriptive of the extent of the demagnetization when it is determined as the demagnetization.

The demagnetization responsive timing changing unit 40 is a means to change the timing, at which the maximum current relative to the phase of the motor rotor 75 is fed so as to increase the reluctance torque of the motor 6, in the event that the determining unit 39 determines the magnetic force to be out of the predetermined permissible range. The change of the timing at which the maximum current is supplied may be of a type so as to change the phase without changing, for example, an electric current waveform (sine wave or others), or so as to change the timing thereof by changing the electric current waveform. It is to be noted that, where the determining unit 39 is capable of determining the extent of demagnetization, the demagnetization responsive timing changing unit 40 may be of a type capable of changing the extent of change of the timing, at which the maximum current is supplied relative to the phase of the motor rotor 75, in dependence on the extent of demagnetization outputted from the determining unit 39.

The demagnetization responsive motor drive limiting unit 43 is a means to apply a limit to the output from the inverter device 22 in the event that the determining unit 39 determines the magnetic force to be out of the predetermined permissible range. The limit of the output of the inverter device 22 by the demagnetization responsive motor drive limiting unit 43 may be, for example, a process of lowering the output of the electric current value or the torque, which will become a drive command which will be an output of the PWM driver 32 or the motor drive control unit 33, or a process of stopping the output. Also, it may be a process of interrupting the output of the inverter 31. It is to be noted that in the case of a drive halt, it is preferred that the motor 6 is rotatable.

The abnormality annunciating unit 41 referred to above is a means to output an abnormality occurrence information to the electric control unit 21 in the event that the magnetic force determined by the magnetic force determining unit 38 is determined to be demagnetization by the determining unit 39. The abnormality display unit 42 provided in the electric control unit 21 is a means to output information indicative of the occurrence of an abnormality or to cause the display device 27 in a driver's seat to provide a display annunciating the occurrence of an abnormality in response to the abnormality occurrence information outputted from the abnormality annunciating unit 41. Where the determining unit 39 is provided in the electric control unit 21, in response to a result of determination, which indicates that the demagnetization is determined by the determining unit 39, the display to annunciate the occurrence of the abnormality is effectuated. The display to the display device 27 may be rendered to be a display in the form of characters and/or symbols, for example a display in the form of icons.

The demagnetization responsive operation according to the magnetic force estimation and its estimation result by the present structure mentioned above will be described next. The magnetic force estimating unit 38 estimates, at all times, the magnetic force of the permanent magnet 80 of the motor rotor 75 of the motor 6 in accordance with the predetermined rule from the respective outputs of the various sensors 35, 36 and 37 (the outputs of two of those sensors). The determining unit 39 monitors this result of estimation, compare the magnetic force estimated by the magnetic force estimating unit 38 with the predetermined permissible range, and determined the occurrence of demagnetization in the event that the magnetic force departs from the predetermined permissible range. It is to be noted that, in the event of out of the predetermined permissible range, the extent of demagnetization may be determined, too.

Where the determining unit 39 determines the occurrence of demagnetization, the demagnetization responsive timing changing unit 40 applies to the motor drive control unit 33 a command to change the timing, at which the maximum current relative to the phase of the rotor 75 is fed, so that the reluctance torque of the motor 6 may increase. This change of the timing will be hereinafter discussed.

With the synchronous motor, the alternating current is supplied to the stator coil 78 to generate a revolving magnetic field to thereby drive the rotor 75. In such case, in the embedded permanent magnet synchronous motor, the magnet torque and the reluctance torque are developed and rotation takes place under the two type of torques. The magnet torque is a torque generated as a result of the interaction between the permanent magnet 80 on the rotor 75 side and the stator 73m. On the other hand, the reluctance torque is a torque resulting from the magnetic force of attraction F (shown in FIG. 7) developed between the core portion 79 on the rotor 75 side and the stator 73m.

Figure 8:
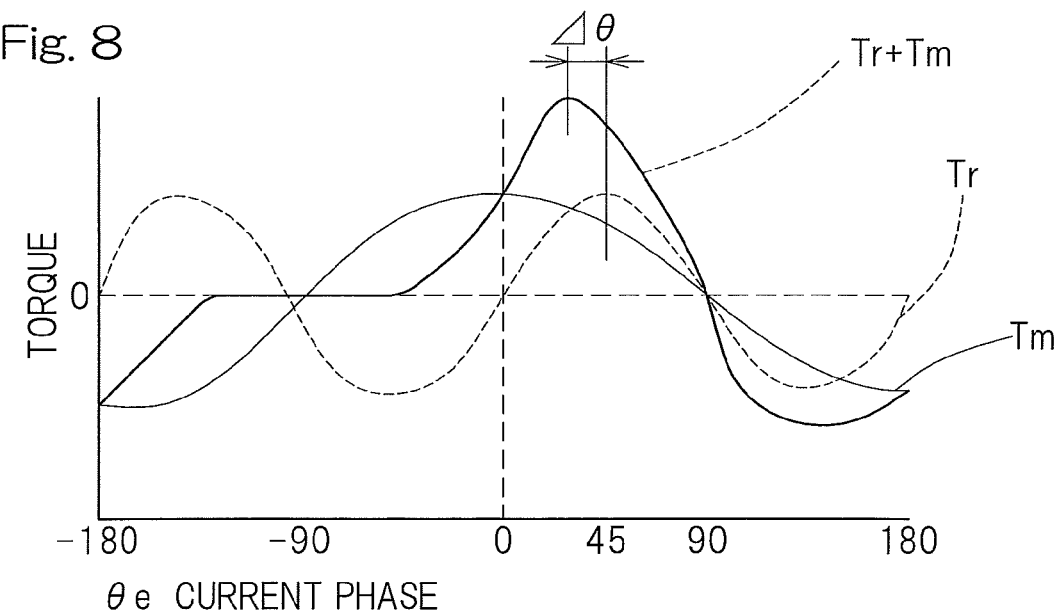
FIG. 8 is a graphed characteristic chart showing the relationship between the magnet torque, the reluctance torque of the motor and the phase of an electric current.

Referring to FIG. 8, the magnet torque Tm is proportional to the electric current, and becomes, as shown in FIG. 8, maximum when the phase θ between the revolving magnetic field and the rotor permanent magnet 80 is zero. On the other hand, the reluctance torque Tr is proportional to the square of the electric current and becomes maximum when the phase θ is 45°. Because of that, in the embedded permanent magnet synchronous motor employed in the practice of this embodiment of the present invention, at normal time it is driven under a current application condition in which the sum of those torques Tm and Tr (i.e., Tm+Tr) becomes maximum. For example, assuming that the sum of those torques Tm+Tr becomes maximum at the phase θ (for example, 40°), the control by the motor drive control unit 33 shown in FIG. 2 takes place in order that the maximum electric current is flows at this phase θ=θe (40°). In other words, the electric current control is performed so that the position at which the amplitude of the alternating current such as, for example, a sine waveform attains the maximum value may be that phase θ mentioned above.

Figure 9:
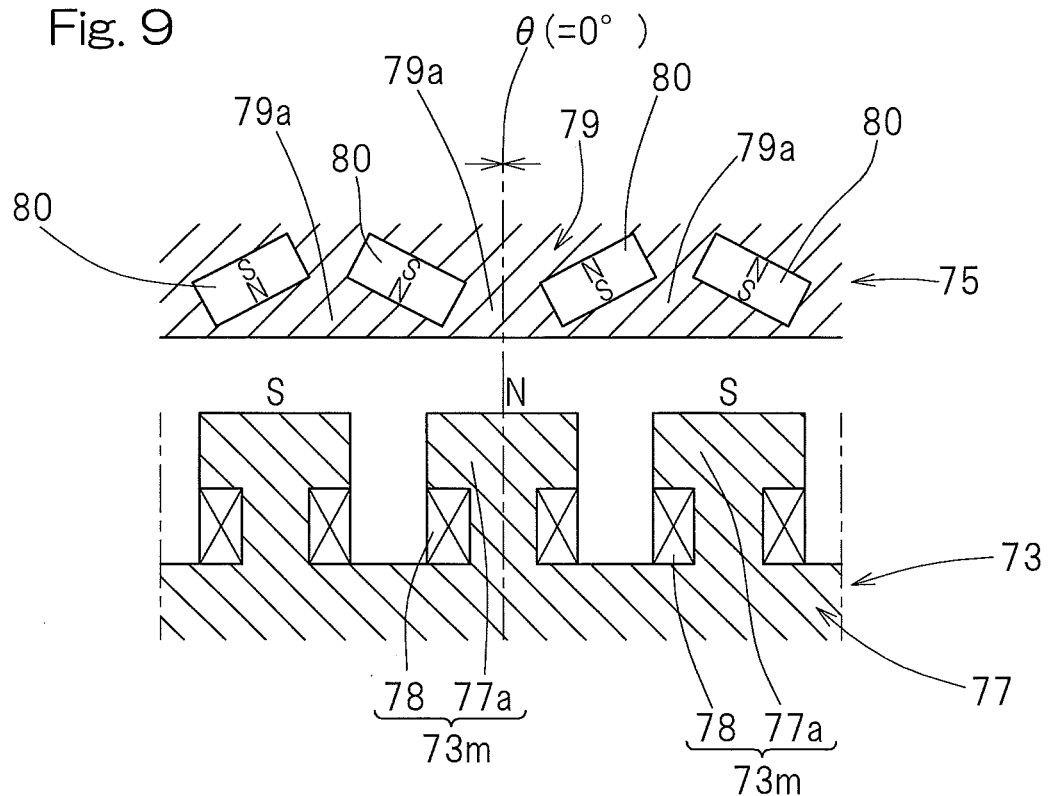
FIG. 9 is a sectional schematic diagram showing the motor held in a condition in which the phase of a rotor is zero.
Figure 10:
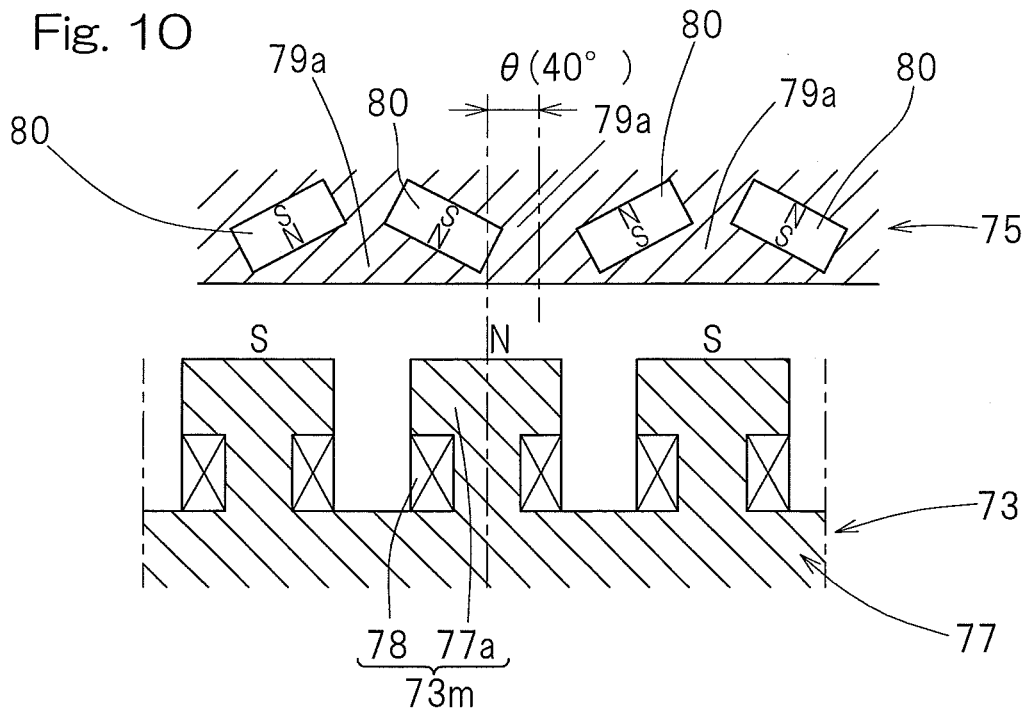
FIG. 10 is a sectional schematic diagram showing the motor held in a condition in which the phase of the rotor is 40°.

FIG. 9 illustrates a rotor rotation position at which the phase θ become a zero degree. FIG. 10 illustrates a rotor rotation position at which the phase θ becomes 40 degree. It is to be noted that FIGS. 9 and 10 are diagrams to show facing the stator 73 and the rotor 75 are viewed as developed in plane.

If the determining unit 39 determines the occurrence of demagnetization when the control of the current phase is so performed as to render the sum of the torques Tm+Tr to be maximal at the normal time as hereinabove described, the demagnetization responsive timing changing unit 40 changes the timing (the phase θ), at which the maximum current is supplied, so that the reluctance torque Tr may increase. This change in timing is a change so made as to bring the reluctance torque Tr close to the phase θ at which it becomes maximum and, for example, it is assumed that the phase of 40° at the normal time is advanced only a degree of Δθ (=5°) to 45°. It is, however, to be noted that the change may not necessarily be so made as to render that the reluctance torque Tr to become maximum and may be so made as to render the reluctance torque Tr to increase.

As described above, in the event of the determination of the occurrence of demagnetization, so that the reluctance torque of the motor 6 may increase, the timing at which the maximum current relative to the phase of the rotor 75 is supplied is changed. By this reason, it functions as a reluctance motor and any reduction in motor driving force can be suppressed as possible as it can while the influence of the demagnetization is suppressed. Because of that, in the event of the occurrence of the demagnetization, with respect to the movement of the automobile to the place, such as, for example, a repair shop, or where a repair is available, it is possible to allow the automobile to run by its own bootstraps.

Also, when the determining unit 39 determines the occurrence of demagnetization, the demagnetization responsive motor drive limiting unit 43 applies a limitation such as, for example, a reduction of the driving current, to an output of the inverter device 22. Accordingly, when, for example, the motor 6 is held in a high temperature condition, an increase of the temperature beyond the current temperature is avoided by taking a treatment to reduce the output of the motor 6 and, therefore, more possible deterioration of the magnet of the motor 6 can be avoided beforehand. If the motor 6 is an embedded permanent magnet synchronous motor of a type utilizing a neodymium permanent magnet, as a result that the heat resistance temperature of the permanent magnet 80 is low and result that the ambient temperature thereof exceed such heat resistance temperature, the magnet will result in an irreversible demagnetization, so that the motor driving capability is abruptly decreased and, in the worst case it may happen, the automobile will become incapable of being driven. However, if a treatment to inhibit or stop the output of the motor 6 will be taken place and if the permanent magnet 80 is beforehand prevented from further deteriorating, the drive incapability of the motor 6 can be avoided and the automobile can be driven to the place such as a repair shop, where the repair is available. It is to be noted that the predetermined permissible range of the determining unit 39 used when the timing is changed by the demagnetization responsive timing changing unit 40 and that used when the drive limitation is applied by the demagnetization responsive motor drive limiting unit 43 may be different from each other so that the determination output can be carried out based on one of the predetermined permissible ranges whichever appropriate.

In the event that the determining unit 39 determines the occurrence of demagnetization, the abnormality annunciating unit 41 furthermore annunciates the occurrence of an abnormality to the electric control unit 21. By this annunciation of the abnormality, a proper integrated control of the automobile as a whole by the electric control unit 21 can take place. Also, as a result of the annunciation of the abnormality, the abnormality display unit 42 of the electric control unit 21 causes the display device 27 in the driver's seat to provide an indication of the abnormality. For this reason, in the event that the roadability of the electric automobile is not good, the driver can be acknowledged that the cause thereof lies in the demagnetization and, therefore, a proper treatment can be more quickly taken.

In the practice of this embodiment of the present invention, in view of the fact that the motor 6 forms the in-wheel motor drive device 8 and compactization can therefore be achieved, a high speed rotating specification is employed for the motor 6 and, for the reduction gear 7, the cycloid reduction gear is employed which can provide a high speed reducing ratio of 4 or higher (specifically, a high speed reducing ratio of 10 or higher). When the motor 6 rotates at a high speed, the eddy current loss is large and heat emission resulting from the eddy current loss become considerable. Accordingly, the permanent magnet 80 of the motor 6 is apt to involve a high temperature and, hence, the demagnetization of the permanent magnet is apt to occur under the high temperature. Because of those, effects brought about by the use of the magnetic force estimating unit 38, the determining unit 39 and the demagnetization responsive timing changing unit 40, and so on, can become more effective in this embodiment.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

REFERENCE NUMERALS

1 . . . Automobile body structure
2, 3 . . . Wheel
4, 5 . . . Wheel support bearing assembly
6 . . . Motor
7 . . . Reduction gear
8 . . . In-wheel motor drive device
9, 10 . . . Electrically powered brake
11 . . . Rudder mechanism
12 . . . Steering mechanism
20 . . . Motor control device
21 . . . Electric control unit (ECU)
22 . . . Inverter device
24 . . . Rotation sensor
27 . . . Display device
28 . . . Power circuit unit
29 . . . Motor control unit
31 . . . Inverter
32 . . . PWM driver
33 . . . Motor drive control unit
35 . . . Electric current detecting unit
36 . . . Angle sensor
37 . . . Voltage sensor
38 . . . Magnetic force estimating unit
39 . . . Determining Unit
40 . . . Demagnetization responsive timing changing unit
41 . . . Abnormality annunciating unit
42 . . . Abnormality display unit
43 . . . Demagnetization responsive motor drive limiting unit
73 . . . Stator
73m . . . Magnet unit on the stator side
75 . . . Rotor
77a . . . Teeth

What is claimed is:

1. A motor control device for an electric automobile of a type equipped with a motor drive control unit configured to perform a control appropriate to a magnetic pole position of a motor rotor relative to an embedded permanent magnet synchronous motor, which is a motor used to drive a vehicle wheel, the motor control device comprising:
a plurality of sensors configured to detect at least two of the motor rotation number, motor voltage and motor current of the motor respectively;

a magnetic force estimating unit configured to estimate the magnetic force of a permanent magnet, used in the motor rotor of the motor, from detection signals indicative of at least two of the motor rotation number, the motor voltage and the motor current of the motor in accordance with a predetermined rule;

a determining unit configured to determine whether or not the magnetic force estimated by the magnetic force estimating unit is within a predetermined permissible range which is determined as a range in which no demagnetization occur; and a demagnetization responsive timing change unit configured to make the motor drive control unit change the timing, at which the maximum electric current relative to a phase of the motor rotor is fed, in order to enable the reluctance torque of the motor to be increased in the event that the determining unit determines the magnetic force to be out of the predetermined permissible range.

2. The motor control device for the electric automobile as claimed in claim 1, further comprising a demagnetization responsive motor drive limiting unit configured to limit a motor drive output from the motor drive control unit in the event that the determining unit determines the magnetic force to be out of the predetermined permissible range.

3. The motor control device for the electric automobile as claimed in claim 1, further comprising an ECU, which is an electric control unit configured to integrally control the automobile as a whole, and an inverter device including a power circuit unit, which includes an inverter to convert a direct current power of a battery into an alternating current power used to drive the motor, and a motor control unit configured to control at least the power circuit unit in accordance with a control of the electric control unit, and the magnetic force estimating unit, the determining unit and the demagnetization responsive timing changing unit are provided in the inverter device.

4. The motor control device for the electric automobile as claimed in claim 3, in which the inverter device is provided with an abnormality annunciating unit configured to output information indicative of the occurrence of demagnetization to the electric control unit in the event that the determining unit determines the magnetic force to be out of the predetermined permissible range.

5. The motor control device for the electric automobile as claimed in claim 3, further comprising an abnormality display unit in the electric control device configured to display and to annunciate the occurrence of an abnormality to a display device in a driver's seat in the event that the determining unit determines the magnetic force to be out of the predetermined permissible range.

6. The motor control device for the electric automobile as claimed in claim 1, further comprising an ECU, which is an electric control unit configured to integrally control the automobile as a whole, and an inverter device including a power circuit unit, which includes an inverter to convert a direct current power of a battery into an alternating current power used to drive the motor, and a motor control unit configured to control at least the power circuit unit in accordance with a control of the electric control unit, and the magnetic force estimating unit and the determining unit are provided in the electric control unit.

7. The motor control device for the electric automobile as claimed in claim 1, in which the motor is an embedded permanent magnet synchronous motor of a type utilizing a neodymium permanent magnet.

8. The motor control device for the electric automobile as claimed in claim 1, in which the motor is a motor used to individually drive vehicle wheels of the electric automobile.

9. The motor control device for the electric automobile as claimed in claim 8, in which the motor forms a part of an in-wheel motor drive device of a type having a part or the whole thereof disposed inside a vehicle wheel and made up of the motor, a wheel support bearing assembly and a reduction gear.

10. The motor control device for the electric automobile as claimed in claim 1, further comprising a reduction gear configured to reduce the speed of rotation of the motor, which is a cycloid reduction gear having a high speed reducing ratio of 4 or higher.

11. An electric automobile equipped with the motor control device for the electric automobile as defined in claim 1.

\* \* \* \* \*

UNITED STATES PATENT AND TRADEMARK OFFICE
CERTIFICATE OF CORRECTION

| | | |
|---|---|---|
| PATENT NO. | : 9,172,319 B2 | Page 1 of 1 |
| APPLICATION NO. | : 14/355478 | |
| DATED | : October 27, 2015 | |
| INVENTOR(S) | : Takayoshi Ozaki | |

It is certified that error appears in the above-identified patent and that said Letters Patent is hereby corrected as shown below:

IN THE SPECIFICATION

Column 1, Lines 13-16

Below "reference" delete "This application is based on and claims Convention priority to Japanese patent application No. 2011-252223, filed Nov. 18, 2011, the entire disclosure of which is herein incorporated by reference as a part of this application.".

Signed and Sealed this
Second Day of February, 2016

Michelle K. Lee
*Director of the United States Patent and Trademark Office*